G. SCHADEE.
VEHICLE WHEEL.
APPLICATION FILED SEPT. 24, 1917.
1,272,122.
Patented July 9, 1918.
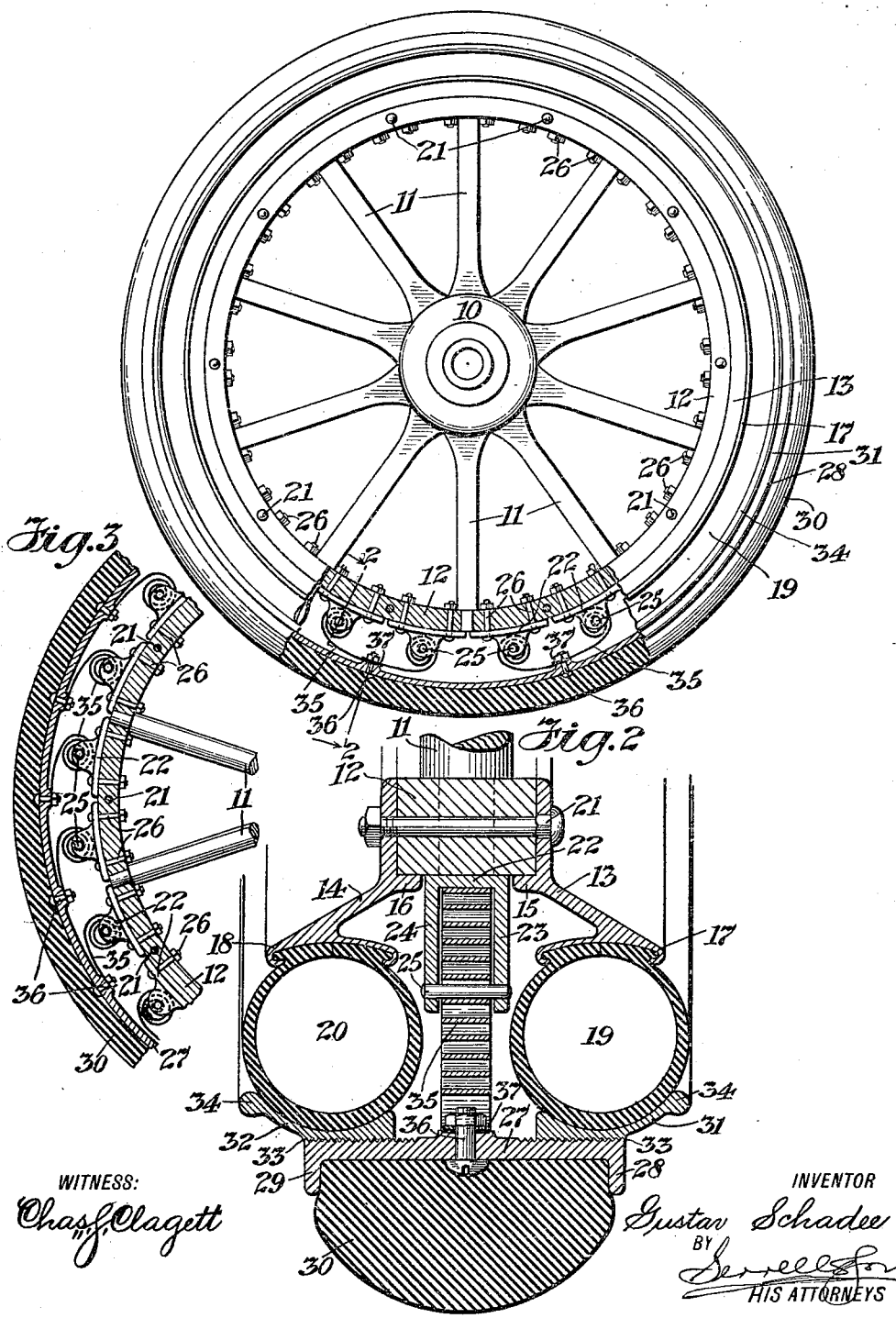
WITNESS:
Chas. F. Clagett
INVENTOR
Gustav Schadee
BY
Serrell Son
HIS ATTORNEYS

UNITED STATES PATENT OFFICE.

GUSTAV SCHADEE, OF NEW YORK, N. Y., ASSIGNOR, BY MESNE ASSIGNMENTS, OF TWO-THIRDS TO EMMA G. GALLAGHER AND ONE-THIRD TO ALICE SCHADEE, BOTH OF NEW YORK, N. Y.

VEHICLE-WHEEL.

1,272,122.  Specification of Letters Patent.  Patented July 9, 1918.

Application filed September 24, 1917. Serial No. 192,884.

*To all whom it may concern:*

Be it known that I, GUSTAV SCHADEE, a citizen of the United States, residing in the borough of Manhattan, city, county, and State of New York, have invented an Improvement in Vehicle-Wheels, of which the following is a specification.

This invention relates to a vehicle wheel and more particularly to that form of vehicle wheel shown and described in Letters Patent No. 1,215,924 granted to George S. Gallagher and myself on February 13, 1917, which type of vehicle wheel is especially adapted for use in motor trucks although it is understood may be used for pleasure vehicles and other purposes.

In the form of the invention shown and described in the Letters Patent aforesaid, the mechanical features by which the resiliency in the wheel is effected comprise a series of pins adjustably secured in the felly and inner rim and extending between the inner rim and into a recess provided therefor in a flanged portion of the outer rim together with a spring surrounding each of these rims and extending between the shoulder on the same and the face of the flanges on the outer rim. The strains including the side thrust in the use of this form of wheel are likely in time to cause the parts to wear to such an extent as to materially impair their functions and consequently decrease the efficiency of the wheel, and the object of the present invention is to overcome this difficulty. The wheel constructed in accordance with my present invention, like the one shown and described in the Letters Patent aforesaid, includes a hub, a felly, spokes connecting the hub and felly, inner and outer rim members with pneumatic or other yielding tubes between the same, but instead of employing the pins and springs to which reference has hereinbefore been made I now prefer to employ a series of brackets and pins connected to the face of the felly, together with a plurality of volute springs, one end of each of which is connected to a pin fixed in the corresponding bracket while the opposite end is suitably secured in the outer rim of the wheel, these springs being placed in similar positions or, employed in sets of two placed in opposite positions as will be hereinafter more particularly described.

In the drawing:

Figure 1 is an elevation and partial cross section of a vehicle wheel made in accordance with this invention.

Fig. 2 is an enlarged cross section on line 2—2 Fig. 1, and

Fig. 3 is a cross section showing a modified form of the invention.

Referring particularly to the drawing it will be seen that a vehicle wheel made in accordance with this invention comprises a hub 10 in which suitable spokes 11 are secured at one end while at their opposite ends these spokes are fixed in a felly 12. Associated with the felly I employ an inner rim preferably comprising an inner rim member 13 and an inner rim member 14. These inner rim members at one end are adapted to abut against the side portions of the felly 12 and are provided with flanges 15 and 16 respectively adapted to engage a part of the face of the felly 12. In its opposite end the inner rim 13 is provided with a clamp 17 and similarly the inner rim 14 is provided with a clamp 18, these clamps being adapted to grip pneumatic tubes 19 and 20 respectively which are made part of the wheel, in a manner similar to that described in Letters Patent aforesaid, it being understood that any suitable connections may be made between these pneumatic tubes for inflating the same and maintaining an equal pressure within them. The inner rim members may be secured to the wheel in any suitable manner, for example, as shown in the drawing, by bolts 21.

Also associated with the felly and lying against the face thereof between the flanges 15 and 16 I employ a series of brackets 22. Each of these brackets 22 includes spaced flanges 23 and 24 depending therefrom and made in any suitable configuration. Extending between and suitably secured in the outer portions of the flanges of each bracket is a pin 25, and each bracket may be suitably connected to the felly by means of bolts 26 or otherwise.

I also employ an outer rim 27. This is fitted with side flanges 28 and 29 between which is a tread member 30 made of rubber or any other similar and suitable material. The inner face of the outer rim member 27 is preferably screw threaded as indicated at 33 to receive the tube rings 31 and 32, the tube ring 31 being employed to receive and maintain in position the outer portion of the pneumatic tube 19, while the tube ring 32 is employed to receive and maintain in position the outer portion of the pneumatic tube 20, these tube rings being suitably formed for this purpose. Furthermore the outer edge of each of these tube rings is preferably rounded, rolled, or turned over, as indicated at 34 and extends appreciably beyond the side of the corresponding pneumatic tube in order to protect the same as will be readily understood.

Associated with each of the brackets 22 I employ a volute spring 35. This spring is preferably made of flat metal, but as will be understood, in some instances may be made of round metal. When made of flat metal the width of the same is approximately equal to the distance between the flanges 23 and 24 of the brackets 22 and when made of round metal the diameter thereof is such as to be approximately equal to the distance between these flanges. In either case one end of each spring is securely fixed in the pin 25 secured in the flanges of the bracket with which the spring is associated, while the opposite end of the spring is secured to the outer rim 27 by bolts 36 or otherwise. As indicated in Fig. 1 of the drawing I prefer to employ the brackets 22 and the springs 35 associated therewith in pairs or sets of two, the convolutions of one spring being set in one direction, while the convolutions of the other spring are set in the opposite direction, the inner ends of the springs being connected to the pins associated with their respective brackets while the outer ends of the springs are made so as to form a lap joint as indicated at 37 in order that the same bolts may be employed to secure the outer ends of each pair of springs together and to the outer rim of the wheel. However, as illustrated in Fig. 3, the springs may be so connected as to be independent of each other, and the springs so placed that the convolutions of the same are all in the same direction.

In the use of the wheel as hereinbefore described, it will be apparent that under ordinary circumstances the pneumatic tubes when properly inflated carry the bulk of the weight of the vehicle to which the wheels are attached and that if for any reason these tubes become deflated the springs are sufficient not only to carry the load but to maintain the resiliency of the wheel to substantially the same extent as is obtained in the use of the ordinary pneumatic tires, and that the volute springs are adapted not only to take up the turning strains between the parts of the wheel, but also to provide for resisting side thrusts between these parts without causing any detrimental wear on any member of the structure. It will also be noted that the inner rim member is so constructed that the part thereof on either side of the wheel may be removed independently of the other thereby facilitating repairs or replacing of parts in the brackets on the volute springs connecting the same and the outer rim. It will also be understood that instead of being made in separate parts the outer rim 27 and the tube rings 31 and 32 may be made as an integral structure.

I claim as my invention:

1. In a vehicle wheel and in combination with the felly thereof, an inner rim comprising separable members secured to the inner sides of the felly, an outer rim, pneumatic tubes between the members of the inner rim and the outer rim, a plurality of brackets secured to the face of the felly between the separable members of the inner rim, a corresponding number of volute springs, devices for connecting the inner end of each volute spring in one of the said brackets, and means for connecting the outer end of each volute spring in the said outer rim.

2. In a vehicle wheel and in combination with the felly thereof, an inner rim comprising separable members secured to the sides of the felly, an outer rim, a tube ring connected in each side of the outer rim and corresponding with one of the separable members of the inner rim, a pneumatic tube between each of the members of the inner rim and the corresponding tube ring which together with the said tube ring and inner rim member are separable independently of the corresponding parts on the other side of the outer rim, a plurality of volute springs, a corresponding number of brackets each connected to the face of the felly between the separable members of the inner rim, and having spaced flanges extending therefrom, a pin secured in the flanges of each bracket by which the inner end of one of the said volute springs is connected in the bracket, and means for connecting the outer end of each spring to the said outer rim.

3. In a vehicle wheel and in combination with the felly thereof, an inner rim comprising separable members secured to the sides of the felly, an outer rim with the inner face thereof screw threaded, tube rings adapted to be turned in the screw threaded inner face of the outer rim, there being a tube ring corresponding to each of the separable members of the inner rim, a pneumatic tube between each member of the inner rim and the corresponding tube ring, a plurality of brackets each secured to the face of the felly between the separable parts of the inner rim and having flanges extending therefrom, a pin secured in the flanges of each bracket, a corresponding number of volute springs the inner end of each of which is connected to a pin in one of the said brackets, and bolts by which the outer ends of the said springs are secured in the said outer rim.

Signed by me this 14th day of September, 1917.

GUSTAV SCHADEE.

Copies of this patent may be obtained for five cents each, by addressing the "Commissioner of Patents, Washington, D. C."